(12) United States Patent
Yan et al.

(10) Patent No.: US 12,231,792 B1
(45) Date of Patent: Feb. 18, 2025

(54) PIXEL OUTPUT SETTLING ASSIST WITH DYNAMIC BIAS CURRENT

(71) Applicant: Apple Inc., Cupertino, CA (US)

(72) Inventors: Hai Yan, San Ramon, CA (US); Chiajen Lee, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 114 days.

(21) Appl. No.: 17/934,177

(22) Filed: Sep. 21, 2022

(51) Int. Cl.
*H04N 25/709* (2023.01)
*H04N 25/75* (2023.01)
*H04N 25/778* (2023.01)

(52) U.S. Cl.
CPC .......... *H04N 25/709* (2023.01); *H04N 25/75* (2023.01); *H04N 25/778* (2023.01)

(58) Field of Classification Search
None
See application file for complete search history.

(56) References Cited

U.S. PATENT DOCUMENTS

| | | | |
|---|---|---|---|
| 9,729,807 B2 | 8/2017 | Gendai | |
| 2008/0259193 A1* | 10/2008 | Toya | H04N 25/60 348/308 |
| 2013/0207727 A1* | 8/2013 | Kusuda | H03F 1/26 330/296 |
| 2015/0208008 A1* | 7/2015 | Gendai | H04N 25/78 250/208.1 |
| 2020/0105203 A1* | 4/2020 | Kim | G01R 17/02 |
| 2021/0306583 A1 | 9/2021 | Ramakrishnan | |
| 2022/0078362 A1* | 3/2022 | Jung | H04N 25/75 |
| 2023/0283924 A1* | 9/2023 | Miyazaki | H04N 25/75 348/308 |
| 2024/0163586 A1* | 5/2024 | Zeituni | H04N 25/771 |

* cited by examiner

*Primary Examiner* — Cynthia Segura
(74) *Attorney, Agent, or Firm* — Robert C. Kowert; Kowert, Hood, Munyon, Rankin & Goetzel, P.C.

(57) ABSTRACT

A camera may one or more lenses and an image sensor having an array of light-gathering pixels. The pixels may generate image signals based on light passing through the lenses. The camera may include at least one pixel output settling assist circuit. The pixel output settling assist circuit may be electrically coupled to an output signal line of at least one of the pixels. The pixel output settling assist circuit may include a pixel output voltage change detection circuit and a bias current adjustment circuit. During read-out of the image signals of the at least one pixel, the pixel output voltage change detection circuit may detect a change of a voltage at the output of the pixel. The bias current adjustment circuit may generate and adjust a current injected to the output based on the detected change of the voltage at the output.

20 Claims, 8 Drawing Sheets

PIXEL OUTPUT SETTLING ASSIST WITH DYNAMIC BIAS CURRENT

BACKGROUND

Technical Field

This disclosure relates generally to image or other sensors that include an array of light-gathering pixels, such as may be found in cameras of mobile devices, robotic equipment, or camera of security monitoring, among others. This disclosure also generally relates to electrical circuits to assist output voltage settling of such pixel arrays and operating methods over such electrical circuits.

Description of the Related Art

Cameras are widely used in various electronic devices, such as mobile devices (e.g., smart phones, tablets, laptops, etc.), robotic equipment, or security monitoring devices, among others. A camera in such devices may include an image sensor having an array of light-gathering pixels. The camera may capture light from an environment and pass the light to the image sensor. The pixels of the image sensor may accumulate electrical charge when exposed to the light. The pixels may be electrically coupled to output signals lines (OSLs). At read-out, those charge may be converted to voltage and transferred to the OSLs as electrical signals. The voltage at the OSLs may be measured, based on which an image may be generated. The transfer of a pixel's signals to an OSL may cause a changing transient voltage at the OSL. Thus, when an image sensor includes an array of pixels, the pixels may be individually read out through OSLs. For example, the camera may connect one pixel to an OSL, wait for the pixel's charge to transfer to the OSL and voltage at the OSL to settle to a stable voltage, and then read the voltage at the OSL. Next, the camera may disconnect the pixel from the OSL, and connect the next pixel to the OSL to read out signals from the next pixel. The camera may repeat such operations until signals from all the pixels are read out. Thus, the voltage settling time at the OSLs may affect the camera's frame rate, e.g., how quickly the camera can read out the pixels' signals and get ready for capturing the next image.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112 (f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to pixel output settling assist circuits of a camera. The camera may include one or more lenses and an image sensor. The lenses may receive light from an exterior environment of the camera. The light may pass through the lenses to reach the image sensor. The image sensor may include an array of light-gathering pixels. In some embodiments, the pixels may each include a photodiode that may accumulate electrical charge when exposed to the light captured by the lenses. The charge of the pixels may be read out, based on which an image processor may produce one or more images. In some embodiments, the camera may be part of an electronic device, such as a mobile device (e.g., a smart phone, tablet, laptop, etc.), robotic equipment, a security monitoring device, and the like.

In some embodiments, to read out the charge, the pixels may be individually connected to one or more output signals lines (OSLs) (hereinafter "outputs"). When one pixel is connected to an output, its charge may be transferred to the output to cause a changing transient voltage (e.g., a declining voltage) at the output. In some embodiments, before transferring charge to an output, the camera may first reset the pixel such that its output voltage resets to a reset (or reference) voltage. During the read-out, the camera may measure (or sample) the voltage at the output twice, the first when the output is in the reset state and the second when charge of the pixel has been transferred to the output and the output voltage settles to a stable voltage. The difference between the two samples may represent the amount of charge accumulated by the pixel, which may be used as a value of the pixel to generate an image. Sometimes, such operation is also called Correlated Double Sampling (CDS).

In some embodiments, the camera may include at least one pixel output settling assist circuit that is electrically coupled to an output of at least one pixel of the image sensor. In some embodiments, the pixel output settling assist circuit may include a pixel voltage change detection circuit (hereinafter "voltage change detection circuit") and a bias current adjustment circuit (hereinafter "current adjustment circuit"). The voltage change detection circuit may detect a change of the voltage at the pixel output, whereas the current adjustment circuit may generate and apply a bias current to the output based on the detected change of the voltage. The bias current may assist the charge transfer from the pixel to the output. In some embodiments, the camera may also include a constant bias current circuit that is also electrically coupled to the pixel output. The constant bias current circuit may provide a constant bias current for transferring the pixel change to the output. Thus, the total bias current may be a sum of the bias current (provided by the pixel output settling assist circuit) and the constant bias current (provided by the constant bias current circuit).

In some embodiments, to ensure read-out reliability, the (total) bias current may be required to be the same at the two points-in-time when the output voltage is sampled. In some embodiments, the current adjustment circuit may also adjust the bias current applied to the pixel output based on the detected change of the output voltage, e.g., based on a rate of the change of the voltage. For example, when the pixel has not started transferring charge to an output and the output is in the reset state, the current adjustment circuit may adjust the applied current to zero. When the pixel is connected to the output and starts to transfer charge to the output, the voltage at the output starts to change (e.g., to decline). This change of the voltage may be detected by the voltage change detection circuit, and the current adjustment circuit may begin to generate and apply a non-zero bias current (in addition to a constant bias current) to the output. When the output voltage gradually settles to a stable voltage, the current adjustment circuit may gradually adjust the applied current to zero, and thus the (total) bias current may gradually return to the constant bias current. Thus, as a result, the (total) bias current of the output may stay the same (e.g., equal to the constant bias current) at these two sampling points-in-time.

In some embodiments, the voltage change detection circuit may include at least one capacitor for detecting the voltage change at an output. In some embodiments, the pixel output settling assist circuit may include one or more current amplifier circuits. As a result, the pixel output settling assist circuit may amplify the detected voltage change to a "larger" bias current applied to the output. In some embodiments, the image sensor may be a complementary metal oxide semiconductor (CMOS) image sensor or a charge-coupled device (CCD) image sensor. In some embodiments, the array of pixels of the image sensor may be organized into multiple columns or rows, and each column or row may include multiple ones of the pixels. The camera may include multiple pixel output settling assist circuits respectively corresponding to the multiple columns or rows, such that one pixel output settling assist circuit may be used to assist the voltage settling for multiple pixels within the same column or row.

The disclosed pixel output settling assist circuit can provide several benefits. First, the pixel output settling assist circuit may generate and apply a bias current, in addition to a constant bias current, to pixel outputs, thus accelerating voltage settling at the outputs. As a result, a camera may complete read-out of pixel signals faster and achieve a faster frame rate. In addition, the pixel output settling assist circuit may adjust the value of the applied bias current. As a result, the camera may still maintain the same (total) bias current when sampling output voltages before and after transfer of pixel signals. Further, the pixel output settling assist circuit may use one or more current amplifier circuits to amplify detected voltage change signals to generate a "larger" bias current. As a result, the camera may use relatively small capacitor(s) for detection of the voltage change, thus reducing component footprint and power consumption.

Figure 1:
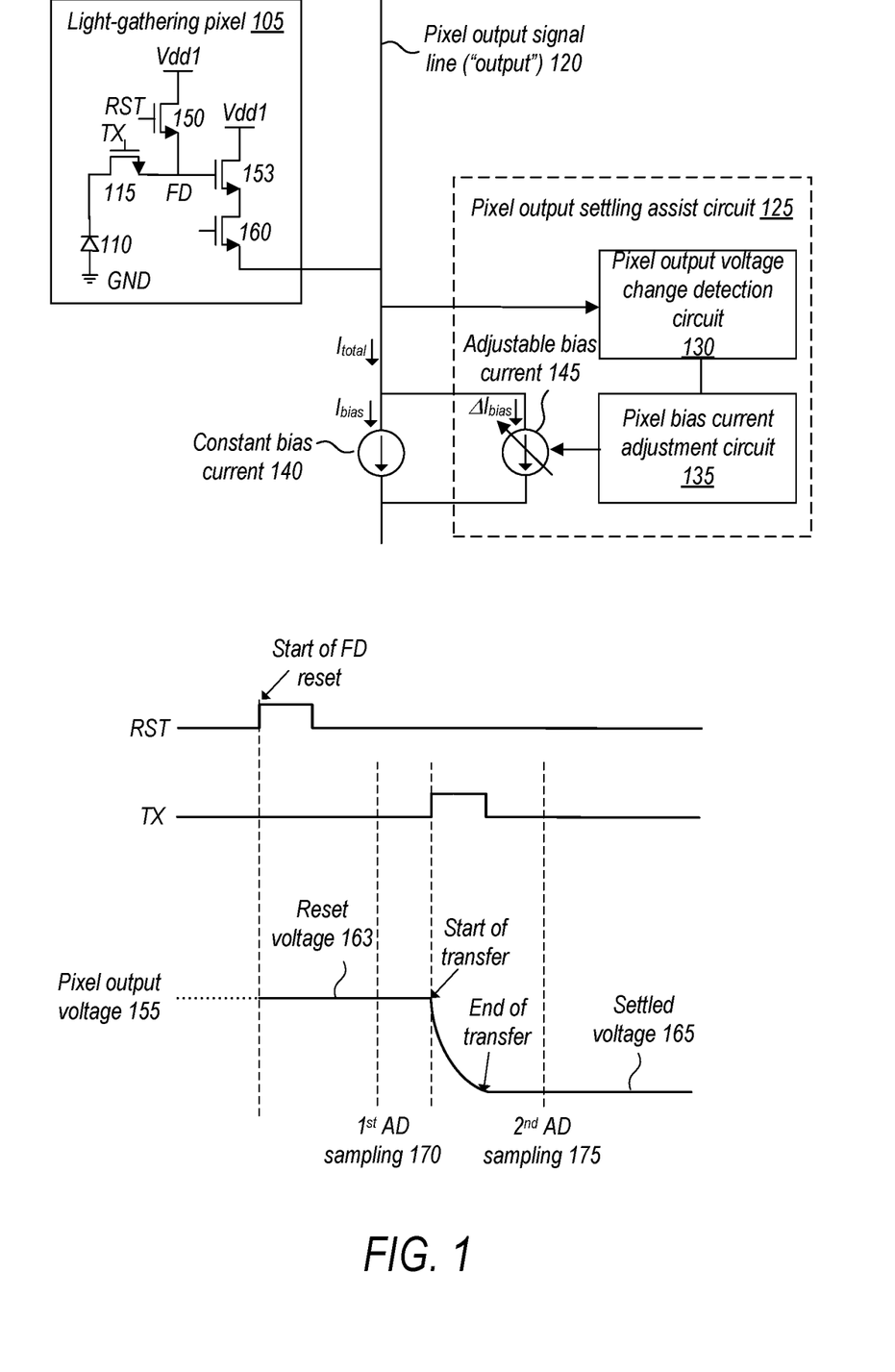
FIG. 1 shows an example pixel read-out circuit of a camera which may include a pixel output settling assist circuit, according to some embodiments.

FIG. 1 shows an example pixel read-out circuit of a camera which may include a pixel output settling assist circuit, according to some embodiments. For purposes of illustration, FIG. 1 shows only one pixel, but the disclosed concept applies to signal read-out of multiple pixels. As indicated in FIG. 1, in some embodiments, pixel 105 may be represented by an equivalent circuit including photodiode 110 and switches 115, 150, 153, and 160. Photodiode 110 may accumulate electrical charge when exposed to light. In some embodiments, switch 150 may be a reset switch that, when closed, resets voltage of the floating diffusion ("FD") node to a reset (or reference) voltage (e.g., Vad1). In some embodiments, switch 115 may be a charge transfer switch that may be controlled by signal TX to transfer charge from photodiode 110 to the FD node. In some embodiments, switch 160 may be a pixel selection switch. When switch 160 (and switch 115) is closed, switch 153 and a bias current (as described above) may form a source-follower (or buffer amplifier circuit) to transmit the voltage of FD to pixel output signal line (OSL) (hereinafter "output") 120. For example, assuming switch 160 is closed, when switch 115 is controlled by signal TX to turn on or close, switch 115 may connect photodiode 110 (indirectly through the source-follower) to output 120, and accordingly the charge accumulated in photodiode 110 may be transferred to output 120 to cause changing transient (e.g., declining) voltage 155 at output 120. After the charge has been transferred to output 120, switch 115 may be controlled by signal TX to turn off or open, such that photodiode 110 may be disconnected from output 120. Next, the camera may move to another pixel and repeat the above operations to read out charge from this pixel. Accordingly, the pixel output voltage 155 may settle to a stable voltage. For purposes of illustration, switches 115, 150, 153, and 160 are shown as MOSFET devices (e.g., NFET devices) as example in FIG. 1. In some embodiments, the switches may be implemented using any appropriate type(s) of semiconductor switching devices. In some embodiments, pixel 105 is one of an arrange of pixels of a CMOS or CCD image sensor.

FIG. 1 shows example waveforms of switch control signals TX (for switch 115) and RST (for switch 150), and pixel output voltage 155. As shown, in some embodiments, before charge transfer to output 120, pixel output voltage 155 may be reset to a reset (or reference) voltage 163 by controlling signal RST. For example, by asserting the signal RST to a logic high voltage (e.g., bit "1"), the FD node voltage may be reset to Vad1. Accordingly, the output voltage 120 may also be reset to Vad1, when switches 153 and 160 are closed. To read out signals from pixel 105, signal TX may be asserted to a logic high voltage (e.g., bit "1") to turn on or close switch 115 to select pixel 105 and thus start transfer of charge from photodiode 110 to output 120. In some embodiments, the transfer of the charge may cause pixel output voltage 155 to decline from the reset voltage. When the charge has been transferred to output 120, signal TX may be deasserted to a logic low voltage (e.g., bit "0") to turn off or open switch 115, and pixel output voltage 155 may settle to a stable voltage 165. In some embodiments, the camera may sample pixel output voltage 155 at least twice, one at the $1^{st}$ point-in-time 170 when pixel output voltage 155 is at reset voltage 155 and one at the $2^{nd}$ point-in-time 175 after pixel output voltage 155 settles to stable voltage 165. In some embodiments, the camera may calculate a difference between the two voltage samples (e.g., to subtract the $2^{nd}$ sampling from the $1^{st}$ sampling) to represent the amount of charge accumulated by photodiode 110 during a frame capturing cycle. In some embodiments, the camera may use the difference as a pixel value of pixel 105, and provide it to an image signal processor (ISP). The ISP may use pixel values from some or all pixels of the image sensor to produce an image.

In some embodiments, the pixel read-out circuit may include pixel output settling assist circuit 125 to assist settling of pixel output voltage 155 at output 120. As indicated in FIG. 1, in some embodiments, pixel output settling assist circuit 125 may be electrically coupled to output 120. In some embodiments, pixel output settling assist circuit 125 may include at least one pixel output voltage change detection circuit (hereinafter "output voltage change detection circuit") 130 and at least one pixel bias current adjustment circuit (hereinafter "current adjustment circuit") 135. In some embodiments, voltage change detection circuit 130 may detect a change of pixel output voltage 155 at output 120. In some embodiments, current adjustment circuit 135 may generate and apply bias current 145 (or $DI_{bias}$) to output 120 based on the detected change of the voltage. As indicated in FIG. 1, the bias current may assist the charge transfer and thus the voltage settling at output 120. In some embodiments, the pixel read-out circuit may further include a constant bias current circuit that is also electrically coupled to 120. The bias current circuit may provide constant bias current 140 (or $I_{bias}$). Thus, the total bias current (or $i_{total}$) may be a sum of bias current 145 (or $DI_{bias}$) (provided by pixel output settling assist circuit 125) and constant bias current 140 (or $I_{bias}$) (provided by the constant bias current circuit), e.g., $i_{total}=DI_{bias}+i_{bias}$ where small letter "i" represents a variable current and capital letter "I" represents a constant current.

In some embodiments, to ensure read-out reliability, the (total) bias current may be required to be the same at the two points-in-time 170 and 175 when pixel output voltage 155 is sampled. Thus, in some embodiments, current adjustment circuit 135 may adjust bias current 145 applied to output 120 based on the change of pixel output voltage 155 that is detected by output voltage change detection circuit 130. In some embodiments, bias current 145 may be adjusted based on a rate of the change of pixel output voltage 155. For example, at point-in-time 170 before charge transfer starts, pixel output voltage 155 is at a stable reset voltage, and thus current adjustment circuit 135 may adjust bias current 145 to zero. When charge transfer starts, pixel output voltage 155 may change (e.g., decline) from the reset voltage, as indicated in FIG. 1. The change (e.g., decline) of voltage 155 may be detected by voltage change detection circuit 130, and accordingly current adjustment circuit 135 may increase bias current 145 to non-zero values and apply bias current 145 to output 120. The non-zero bias current 145 may be added to constant bias current 140 to thus increase the total bias current, which may accelerate the charge transfer from pixel 105 to output 120 and settling (e.g., decline) of pixel output voltage 155. When pixel output voltage 155 gradually settles to stable voltage 165, current adjustment circuit 135 may gradually decrease bias current 145 to zero, and the (total) bias current may gradually return to constant bias current 140. Thus, as a result, the (total) bias current of output 120 may stay the same (e.g., equal to constant bias current 145) at the two sampling time 170 and 175.

Figure 2:
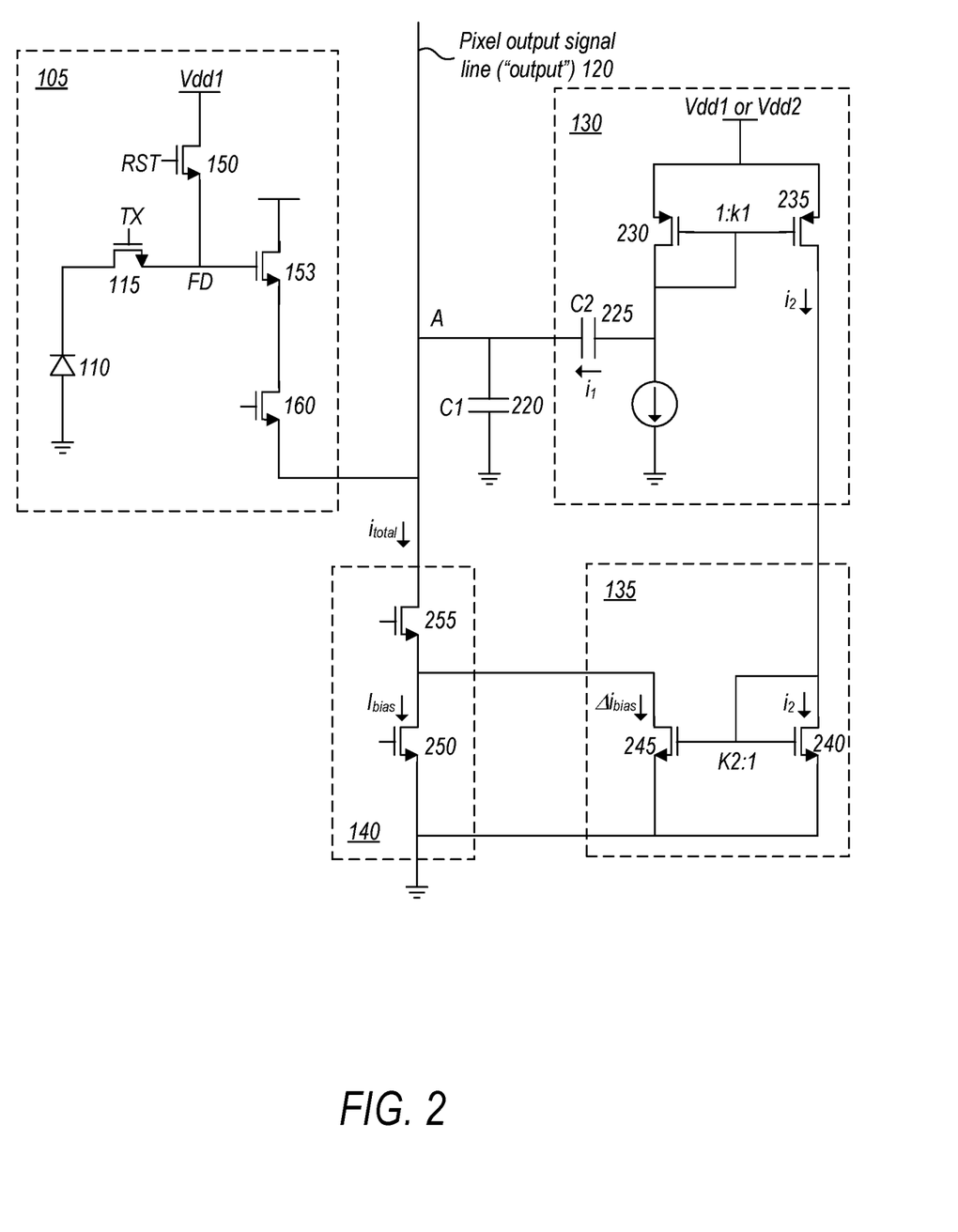
FIG. 2 shows an example implementation of a pixel read-out circuit of a camera which may include a pixel output settling assist circuit, according to some embodiments.

FIG. 2 shows an example implementation of a pixel read-out circuit of a camera which may include a pixel output settling assist circuit, according to some embodiments. As indicated in FIG. 2, in some embodiments, pixel 105 may be represented by the equivalent circuit shown in FIG. 1. As described above, switch 115 may be a charge transfer switch that, when closed, may allow the charge of photodiode 110 to transfer to output 120 (or node A). Switch 160 may serve as a pixel selection switch. When switch 160 is closed, photodiode 110 may be connected to output 120, and switch 153 and bias current (or $i_{total}$) may form a source-follower (or buffer amplifier circuit) to transmit the voltage of FD to output 120 (or node A). In some embodiments, switch 255 may be an optional cascode switch.

As indicated in FIG. 2, in some embodiments, output 120 (or node A) may be coupled with capacitor C1 220. In some embodiments, capacitor C1 220 may be coupled between output 120 (or node A) and ground, such that transfer of the charge from pixel may cause pixel output voltage 155 at output 120 (or voltage $v_A$ at node A) to decline. In some embodiments, the pixel read-out circuit may include voltage change detection circuit 130 and current adjustment circuit 135. As indicated in FIG. 2, in some embodiments, voltage change detection circuit 130 may include capacitor C2 225 that is coupled to output 120 (or node A), e.g., coupled between output 120 (or node A) and a current mirror circuit as described below. When pixel output voltage 155 (or voltage $v_A$) changes (e.g., declines), this may cause a first current (or $i_1$) to flow through C2 225. In some embodiments, the first current (or $i_1$) may represent the change of pixel output voltage 155 (or voltage $v_A$). For example, in some embodiments, the first current (or in) may be approximately proportional to a rate of the change of pixel output voltage 155 (or voltage $v_A$), e.g., $i_1 \propto dv_A/dt$.

Also, as indicated in FIG. 2, in some embodiments, voltage change detection circuit 130 may include a current mirror circuit implemented using switch 230 and 235. Thus, given the first current (or $i_1$) of capacitor C2 225, voltage change detection circuit 130 may generate a second "mirror" current (or $i_2$) flowing from voltage change detection circuit 130 to current adjustment circuit 135, as indicated in FIG. 2. In some embodiments, the current mirror circuit of switches 230-235 may be a current amplifier circuit (e.g., having an amplification factor of $K_1$), such that the second "mirror" current (or $i_2$) may be larger than the first current (or $i_1$), e.g., $i_2 = K_1 \times i_1$.

In some embodiments, current adjustment circuit 135 may include a current mirror circuit implemented using switches 240 and 245. Thus, given the second current (or $i_2$) from voltage change detection circuit 130, current adjustment circuit 135 may generate a third "mirror" current 145 (or $Di_{bias}$) to apply to output 120. In some embodiments, the current mirror circuit of switches 240-245 may be a current amplifier circuit (e.g., having an amplification factor of $K_2$), such that the third "mirror" current 145 (or $Di_{bias}$) may be larger than the first current (or $i_2$), e.g., $Di_{bias} = K_2 \times i_2 = K_2 \times K_1 \times i_1$. In other words, voltage change detection circuit 130 may detect a change of pixel output voltage 155 (e.g., $dv_A/dt$) at output 120, and current adjustment circuit 135 may amplify the detected voltage change signal to generate and apply bias current (or $Di_{bias}$) to output 120. In some embodiments, as described above, the pixel read-out circuit may generate a constant bias current circuit, e.g., implemented using switch 250, to provide constant bias current 140 (or $I_{bias}$) to output 120. Thus, bias current 145 (or $Di_{bias}$) (flowing through switch 245) may be added to constant bias current 140 (flowing through switch 250) to increase the total bias current (or $i_{total}$), which may accelerate the settling (e.g., decline) of pixel output voltage 155. Note that in some embodiments, the amplification factors $K_1$ and/or $K_2$ may be set to various values according to design requirements. Thus, in some embodiments, the current mirror circuit of voltage change detection circuit 130 and/or current adjustment circuit 135 may not necessarily be a current amplifier circuit, but rather a current attenuator circuit. Also, for purposes of illustration, the switches in FIG. 2 are shown as MOSFET devices as example. In some embodiments, the switches may be implemented using any appropriate type(s) of semiconductor switching devices.

Figure 3:
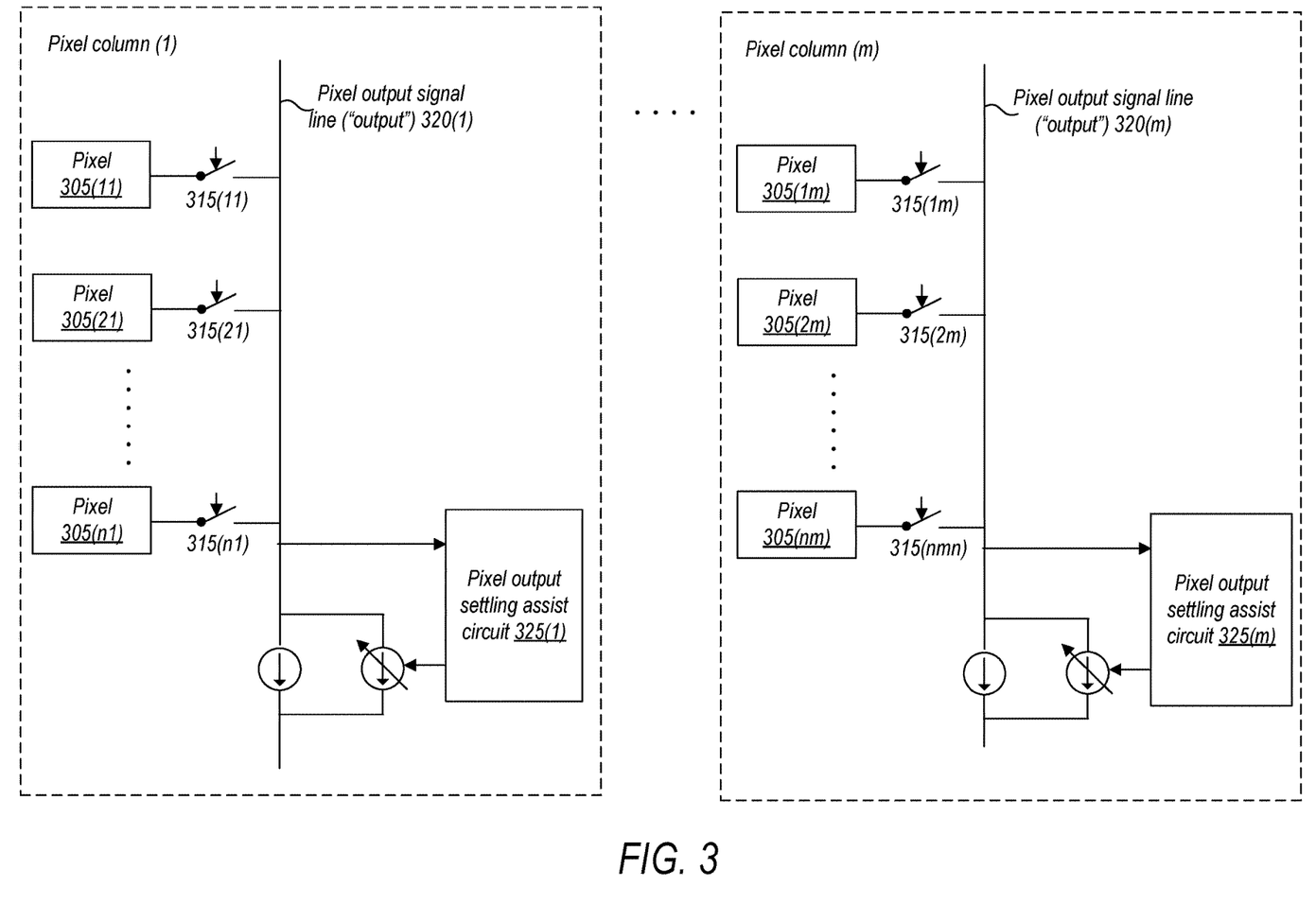
FIG. 3 shows an example configuration of multiple pixel voltage settling circuits respectively corresponding to multiple columns of pixels, according to some embodiments.

In some embodiments, an image sensor (e.g., an CMOS or CCD image sensor) of a camera may include an arrange of pixels organized into multiple columns or rows, where each column or row may include multiple pixels. In some embodiments, the camera may multiple pixel voltage settling circuits, each one of which may correspond to one column or row. FIG. 3 shows an example configuration of multiple pixel voltage settling circuits respectively corresponding to multiple columns of pixels, according to some embodiments. As indicated in FIG. 3, in some embodiments, the arrange of pixels of an image sensor may be divided into m columns, where each column may include n pixels, thus in total m×n pixels. In some embodiments, all the pixels in the same column may be electrically coupled to the same pixel output signal line ("OSL") or output. For example, in FIG. 3, pixels 305 (11), 305 (21), ..., 305 (n1) may be organized into the same pixel column (1). Accordingly, pixels 305 (11), 305 (21), ..., 305 (n1) may be electrically coupled to the same output 320(1) through respective selection switches 315 (11), 315 (21), ..., 315 (n1). In some embodiments, pixel output settling assist circuit 325(1) may be electrically coupled to output 320(1) and used to assist voltage settling for all the pixels 305 (11), 305 (21), ..., 305 (n1) within pixel column (1). Similarly, pixels 305 (1m), 305 (2m), ..., 305 (nm) within the same pixel column (m) may be electrically coupled to the same output 320 (m) through respective selections witches 315 (1m), 315 (2m), ..., 315 (nm), and pixel output settling assist circuit 325 (m) may be electrically coupled to output 320 (m) and used to assist voltage settling for all the pixels 305 (1m), 305 (2m), ..., 305 (nm) within pixel column (m).

In some embodiments, the pixels within the same column may selected and read out individually, e.g., sequentially. To select and read out the pixels sequentially, for example, the selection switches of the pixels may be turned on and off sequentially. For example, consider the pixels 305 (11), 305 (21), ..., 305 (n1) within pixel column (1), the camera may first turn on selection switch 315 (11). Switch 315 (11)) may function similarly like switch 215 described above in FIG. 2. When switch 315 (11) is turned on or closed, pixel 305 (11) may become connected with output 320(1), and thus transfer charge and cause a transient voltage at output 320(1). Pixel output settling assist circuit 325(1) may function similarly as the pixel output settling assist circuits described above. For example, pixel output settling assist circuit 325(1) may detect the change of voltage at output 320(1), and adjust a current applied to the output based on the detected change of voltage to accelerate settling of the output voltage. When the read-out of pixel 305 (11) completes, the camera may obtain a pixel value from pixel 305 (11). Next, the camera may turn off switch 315 (11), and turn on switch 315 (21) to repeat the above operations to read the pixel value of pixel 305 (21). The camera may continue such read-out operations until it reads out signals from all the pixels within pixel column (1). Similarly, the camera may read out pixels from other columns. Also, in some embodiments, the camera may read out different columns synchronously or asynchronously, because the different columns are coupled to different outputs and thus may be read out independently from each other. For example, in a synchronous fashion, the camera may start reading the different columns at or around the time. Assuming the voltage swing at outputs of the different columns are approximately within the same range, the camera may complete reading out these columns at or around the same time. Conversely, in an asynchronous fashion, the camera may read pixels from different columns at different time. Regardless, when the camera reads out some or all of the pixels of the image sensor, the camera may use an ISP to process the pixel values to generate an image.

Figure 4:
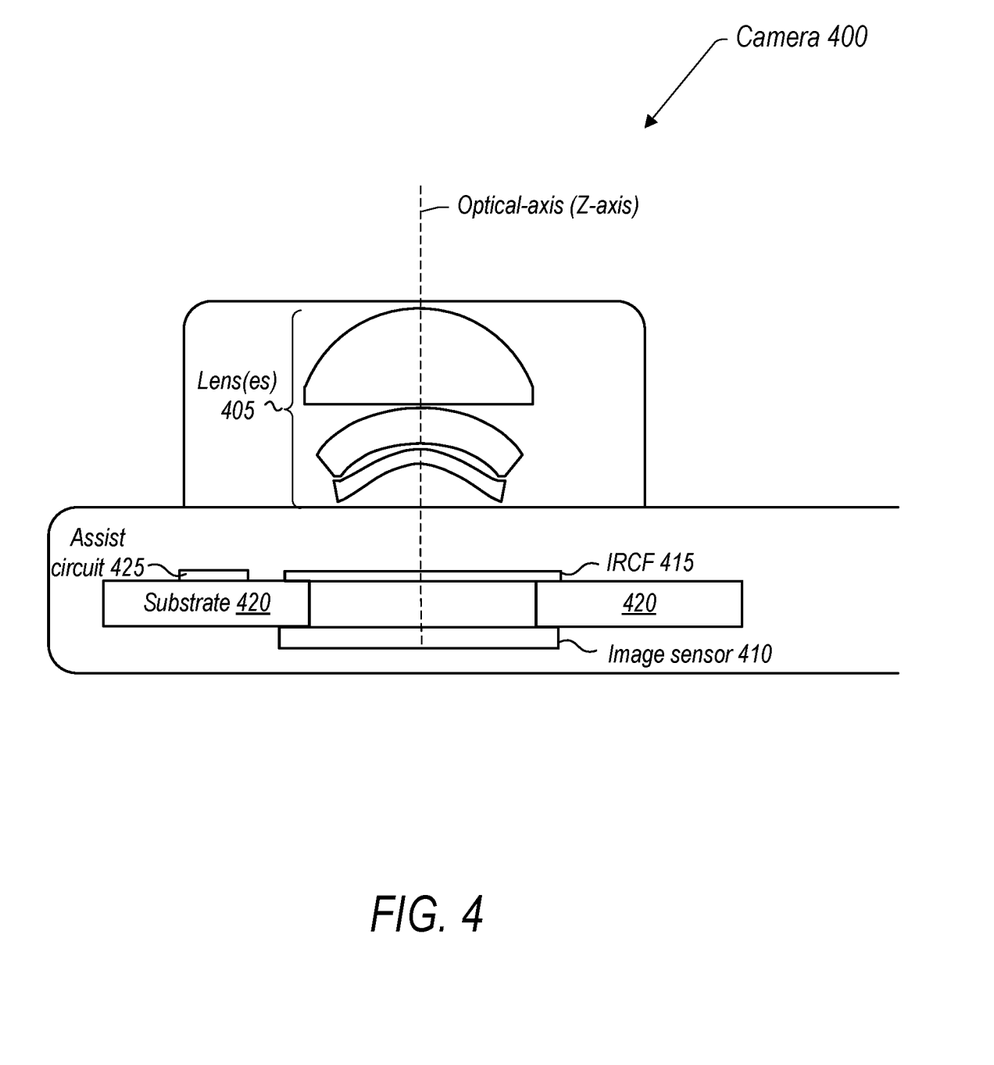
FIG. 4 shows a cross-section view of an example camera that may include one or more lenses and an image sensor comprising an arrange of light-gathering pixels, according to some embodiments.

FIG. 4 shows a cross-section view of an example camera that may include one or more lenses and an image sensor comprising an arrange of light-gathering pixels, according to some embodiments. As indicated in FIG. 4, camera 400 may include one or more lenses 405 and image sensor 410. Camera 400 may capture light from an exterior environment, pass the light through lenses 405 to image sensor 410. Image sensor 410 may include an arrange of pixels that may generate image signals (e.g., represented by accumulated electrical charge) based on the received light. The image signals may be processed by an ISP to generate one or more images. In some embodiments, camera 400 may include infrared cutoff filter (IRCF) 415 which may reduce or block infrared light from reaching image sensor 410. In some embodiments, image sensor 410 may be mounted on substrate 420. In addition, in some embodiments, camera 400 may include one or more image sensor read-out circuits. The read-out circuits may include at least one pixel output settling assist circuit 425 that may assist voltage settling at pixel outputs, as described above.

Figure 5:
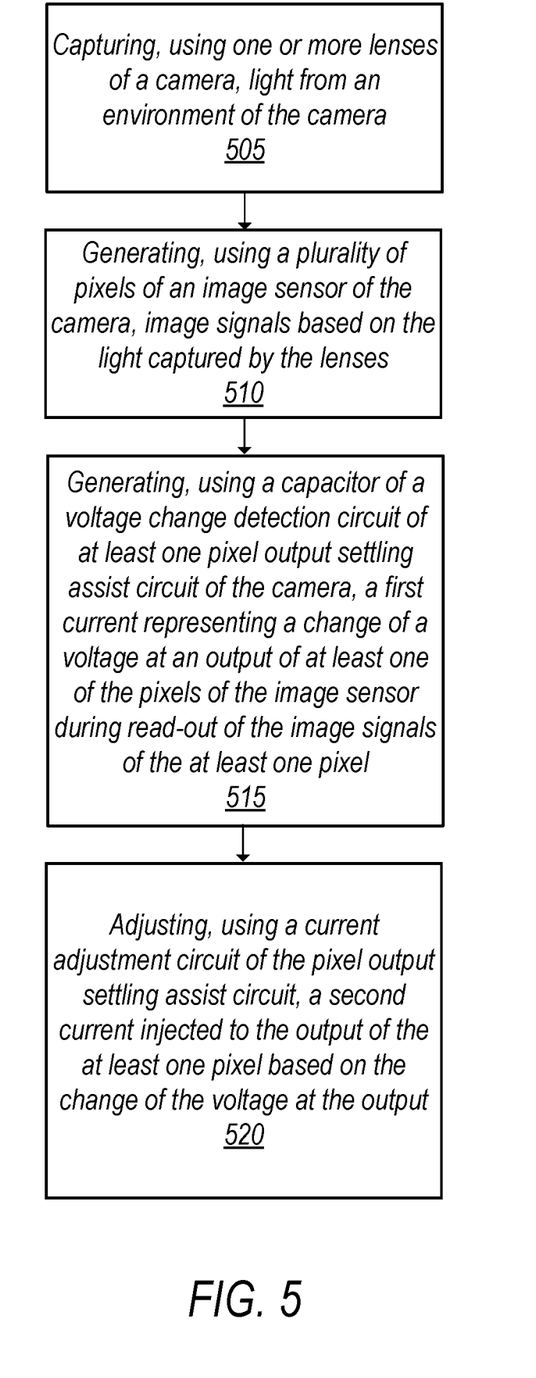
FIG. 5 shows an example flowchart for using a pixel output settling assist circuit in pixel read-out, according to some embodiments.

FIG. 5 shows an example flowchart for using a pixel output settling assist circuit in pixel read-out, according to some embodiments. As indicated in FIG. 5, in some embodiments, light may be captured by a camera from an exterior environment using one or more lenses of the camera, as indicated in block 505. In some embodiments, the light may pass through the lenses to reach an image sensor of the camera which may include an arrange of light-gathering pixels (like the image sensor and pixels described above). In some embodiments, image signals may be generated by the pixels based on the received light, as indicated in block 510. For example, as described above, the pixels may accumulate electrical charge when expose to light, which may be read out by the camera to generate respective pixel values for generating an image. In some embodiments, the camera may include at least one pixel output settling assist circuit electrically coupled to an output of at least one of the pixels, as described above. In some embodiments, a change of a voltage at the output of the pixel may be detected using a capacitor (e.g., capacitor C2 225 in FIG. 2) a voltage change detection circuit of the pixel output settling assist circuit, as described above, as indicated in block 515. For example, in some embodiments, the capacitor may be electrically coupled to the output of the pixel and be able to generate a first current in response to the change of the voltage at the output of the pixel, as described above. Thus, the current generated by the capacitor may be considered representative of the change of the voltage at the output. Also, as described above, in some embodiments, a second, bias current may be generated and applied to the output of the at least one pixel using a current adjustment circuit of the pixel output settling assist circuit. In some embodiments, based on the detected change of voltage at the output, the current adjustment circuit may adjust the second, bias current applied to the output, as indicated in block 520. Also as described above, in some embodiments, the second, bias current may be added in addition to a separate constant bias current of the pixel output.

Figure 6:
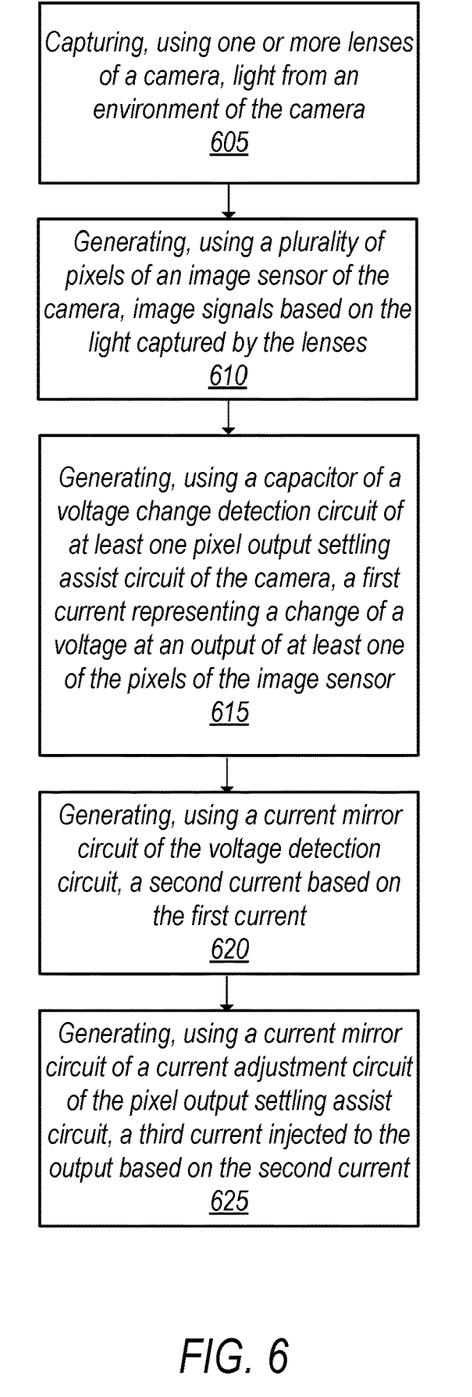
FIG. 6 shows another example flowchart for using a pixel output settling assist circuit in pixel read-out, according to some embodiments.

FIG. 6 shows another example flowchart for using a pixel output settling assist circuit in pixel read-out, according to some embodiments. As indicated in FIG. 5, in some embodiments, light may be captured by a camera from an exterior environment using one or more lenses of the capture, as indicated in block 605. In some embodiments, the pixel may pass through the lenses to reach an image sensor of the camera which may include an arrange of light-gathering pixels (like the image sensor and pixels described above). In some embodiments, image signals may be generated by the pixels based on the received light, as indicated in block 610. For example, as described above, the pixels may accumulate electrical charge when expose to light, which may be read out by the camera to generate respective pixel values for generating an image. In some embodiments, the camera may include at least one pixel output settling assist circuit electrically coupled to an output of at least one of the pixels. As described above, in some embodiments, the pixel output settling assist circuit may include a voltage change detection circuit and a current adjustment circuit. In some embodiments, the voltage change detection circuit may include a capacitor (e.g., capacitor C2 225 in FIG. 2) that may be coupled to the output of the pixels. In some embodiments, the capacitor may generate a first current representing a change of a voltage at the output, as indicated in block 615. As described above, in some embodiments, the voltage change detection circuit may include a current mirror circuit (e.g., the current mirror circuit of switches 230-235 in FIG. 2). Accordingly, the current mirror circuit may generate a second current based on the first current of the capacitor, as indicated in block 620. In some embodiments, the current adjustment circuit of the pixel output settling assist circuit may also include a current mirror circuit (e.g., the current mirror circuit of switches 240-245 in FIG. 2). Thus, in some embodiments, the current adjustment circuit may generate and apply a third current to the output of the pixel based on the second current from the voltage change detection circuit, as indicated in block 625. As described above, in some embodiments, the current adjustment circuit may adjust the value of the applied (third) current to the output based on the change of the voltage at the output.

Figure 7:
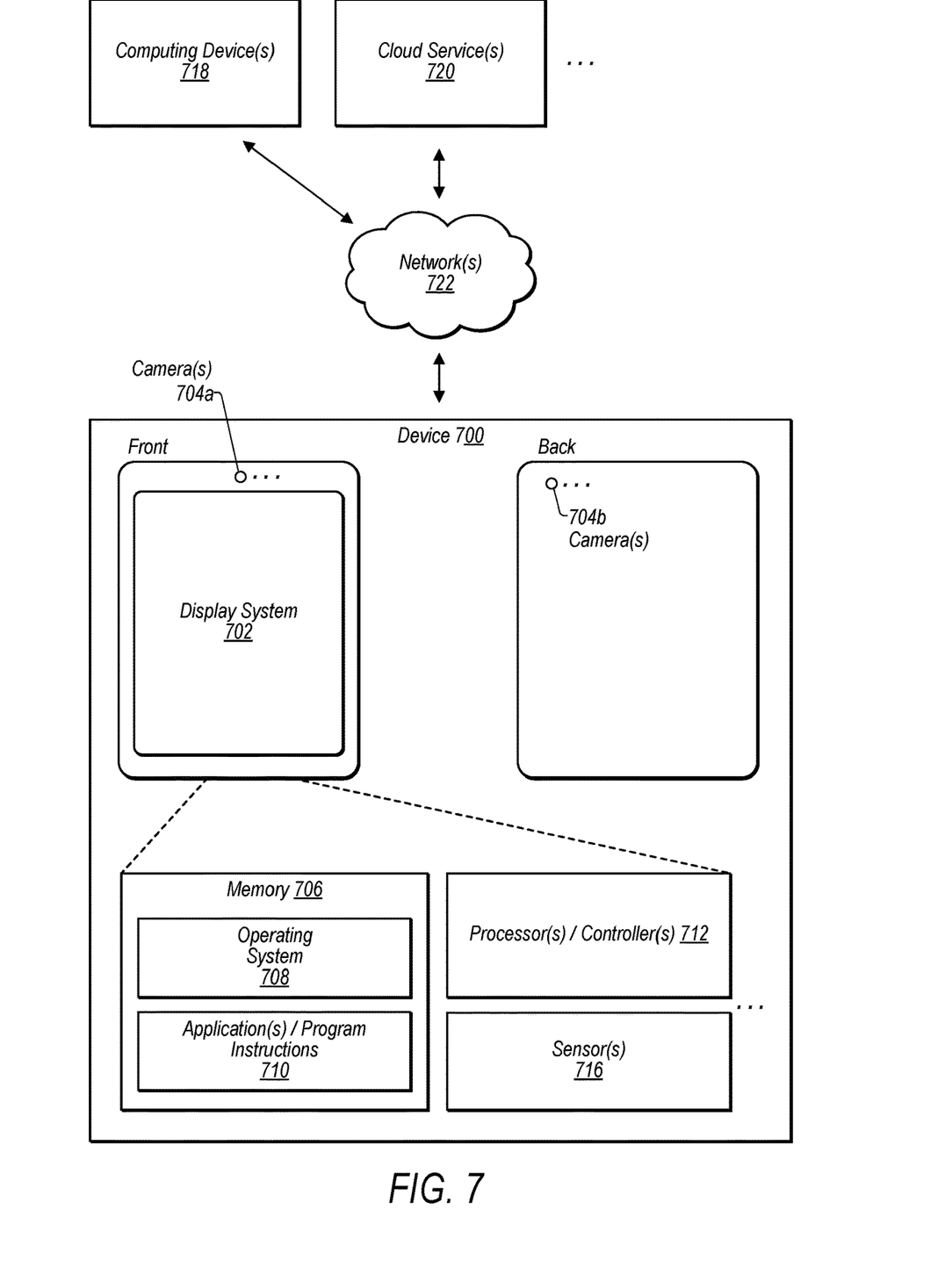
FIG. 7 illustrates a schematic representation of an example device that may include a camera having at least one pixel output settling assist circuit, according to some embodiments.

FIG. 7 illustrates a schematic representation of an example device 700 that may include a camera having at least one pixel output settling assist circuit as described above, according to some embodiments. In some embodiments, the device 700 may be a mobile device and/or a multifunction device. In various embodiments, the device 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 700 may include a display system 702 (e.g., comprising a display and/or a touch-sensitive surface) and/or one or more cameras 704. In some non-limiting embodiments, the display system 702 and/or one or more front-facing cameras 704a may be provided at a front side of the device 700, e.g., as indicated in FIG. 7. Additionally, or alternatively, one or more rear-facing cameras 704b may be provided at a rear side of the device 700. In some embodiments comprising multiple cameras 704, some or all of the cameras may be the same as, or similar to, each other. Additionally, or alternatively, some or all of the cameras may be different from each other. In various embodiments, the location(s) and/or arrangement(s) of the camera(s) 704 may be different than those indicated in FIG. 7.

Among other things, the device 700 may include memory 706 (e.g., comprising an operating system 708 and/or application(s)/program instructions 710), one or more processors and/or controllers 712 (e.g., comprising CPU(s), memory controller(s), display controller(s), and/or camera controller(s), etc.), and/or one or more sensors 716 (e.g., orientation sensor(s), proximity sensor(s), and/or position sensor(s), etc.). In some embodiments, the device 700 may communicate with one or more other devices and/or services, such as computing device(s) 718, cloud service(s) 720, etc., via one or more networks 722. For example, the device 700 may include a network interface (e.g., network interface 710) that enables the device 700 to transmit data to, and receive data from, the network(s) 722. Additionally, or alternatively, the device 700 may be capable of communicating with other devices via wireless communication using any of a variety of communications standards, protocols, and/or technologies.

Figure 8:
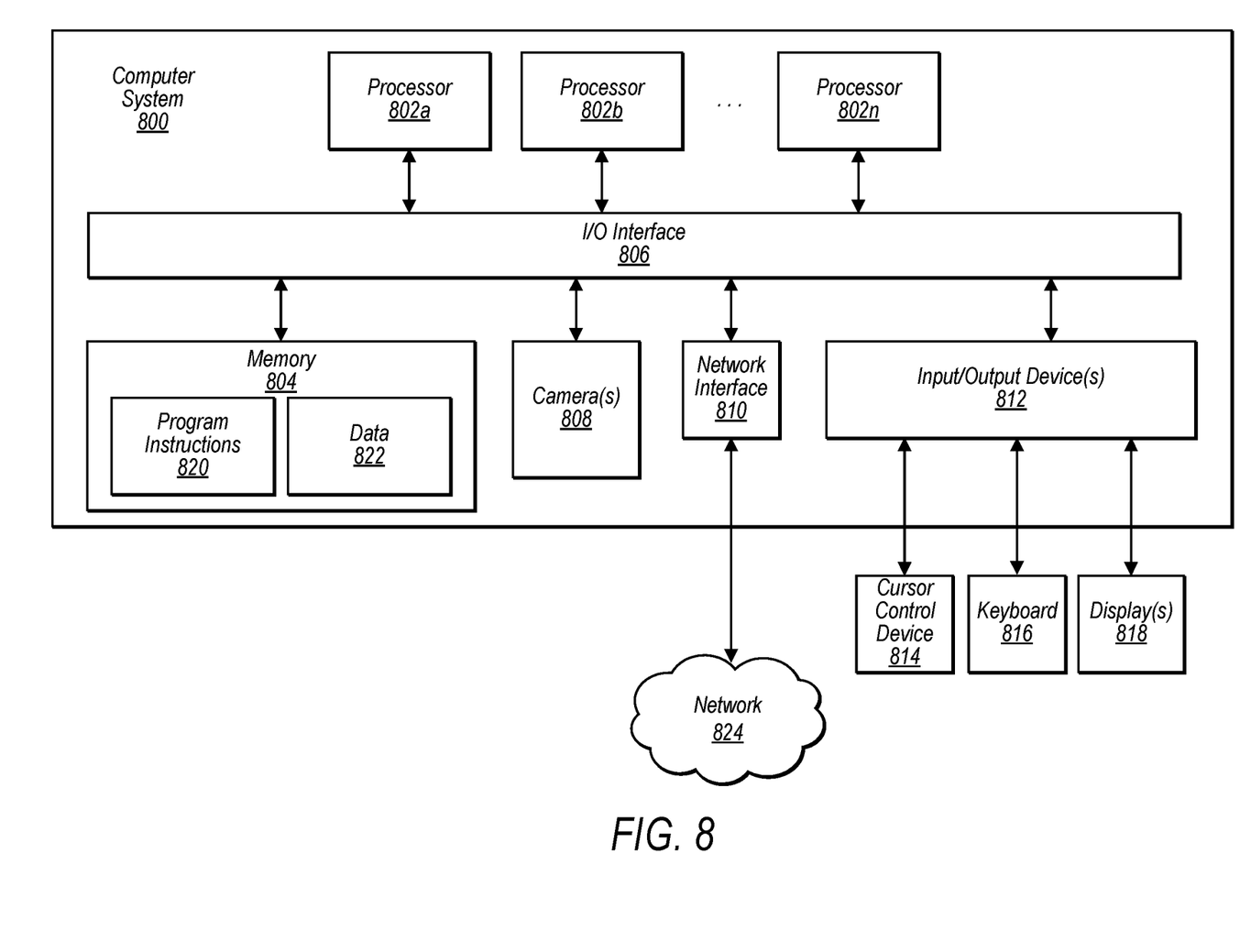
FIG. 8 illustrates a schematic block diagram of an example computing device that may include or host embodiments of a computer device including a camera having at least one pixel output settling assist circuit, according to some embodiments.

FIG. 8 illustrates a schematic block diagram of an example computing device, referred to as computer system 800, that may include or host embodiments of a computer device including a camera having at least one pixel output settling assist circuit as described above, according to some embodiments. In addition, computer system 800 may implement methods for controlling operations of the camera and/or for performing image processing images captured with the camera. In some embodiments, the device 1000 (described above with reference to FIG. 7) may additionally, or alternatively, include some or all of the functional components of the computer system 800 described herein.

The computer system 800 may be configured to execute any or all of the embodiments described above. In different embodiments, computer system 800 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 800 includes one or more processors 802 coupled to a system memory 804 via an input/output (I/O) interface 806. Computer system 800 further includes one or more cameras 808 coupled to the I/O interface 806. Computer system 800 further includes a network interface 810 coupled to I/O interface 806, and one or more input/output devices 812, such as cursor control device 814, keyboard 816, and display(s) 818. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 802, or a multiprocessor system including several processors 802 (e.g., two, four, eight, or another suitable number). Processors 802 may be any suitable processor capable of executing instructions. For example, in various embodiments processors 802 may be general-purpose or embedded processors implementing any of a variety of instruction set architectures (ISAs), such as the x86, PowerPC, SPARC, or MIPS ISAs, or any other suitable ISA. In multiprocessor systems, each of processors 802 may commonly, but not necessarily, implement the same ISA.

System memory 804 may be configured to store program instructions 820 accessible by processor 802. In various embodiments, system memory 804 may be implemented using any suitable memory technology, such as static random access memory (SRAM), synchronous dynamic RAM (SDRAM), nonvolatile/Flash-type memory, or any other type of memory. Additionally, existing camera control data 822 of memory 804 may include any of the information or data structures described above. In some embodiments, program instructions 820 and/or data 822 may be received, sent or stored upon different types of computer-accessible media or on similar media separate from system memory 804 or computer system 800. In various embodiments, some or all of the functionality described herein may be implemented via such a computer system 800.

In one embodiment, I/O interface 806 may be configured to coordinate I/O traffic between processor 802, system memory 804, and any peripheral devices in the device, including network interface 810 or other peripheral interfaces, such as input/output devices 812. In some embodiments, I/O interface 806 may perform any necessary protocol, timing or other data transformations to convert data signals from one component (e.g., system memory 804) into a format suitable for use by another component (e.g., processor 802). In some embodiments, I/O interface 806 may include support for devices attached through various types of peripheral buses, such as a variant of the Peripheral Component Interconnect (PCI) bus standard or the Universal Serial Bus (USB) standard, for example. In some embodiments, the function of I/O interface 806 may be split into two or more separate components, such as a north bridge and a south bridge, for example. Also, in some embodiments some or all of the functionality of I/O interface 806, such as an interface to system memory 804, may be incorporated directly into processor 802.

Network interface 810 may be configured to allow data to be exchanged between computer system 800 and other devices attached to a network 824 (e.g., carrier or agent devices) or between nodes of computer system 800. Network 824 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 810 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 812 may, in some embodiments, include one or more display terminals, keyboards, keypads, touchpads, scanning devices, voice or optical recognition devices, or any other devices suitable for entering or accessing data by one or more computer systems 800. Multiple input/output devices 812 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 810.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   one or more lenses;
   an image sensor comprising a plurality of pixels configured to receive light that passes through the one or more lenses to generate signals for producing an image; and
   at least one pixel output settling assist circuit comprising:
      a voltage change detection circuit comprising a capacitor coupled to an output of at least one of the pixels of the image sensor that is configured to generate a first current representing a change of a voltage at the output of the at least one pixel during read-out of the signals of the at least one pixel; and
      a current adjustment circuit configured to adjust a second current applied to the output of the at least one pixel based on changes of the voltage at the output as the voltage settles to a stable voltage during a settlement period;
   wherein the image sensor is configured to:
      sample (a) a first output voltage of the at least one pixel at a reset voltage and (b) a second output voltage of the least one pixel after transfer of charge from the at least one pixel, wherein the first and second output voltages are sampled at a same level of the second current as controlled by the current adjustment circuit;
      determine an accumulated charge of the at least one pixel based on a difference between the first and second output voltages; and
      process the signals from the pixels indicating accumulated charges of the pixels to generate the image.

2. The system of claim 1, wherein the change of the voltage at the output includes a decline of the voltage at the output of the at least one pixel, and wherein the current adjustment circuit is configured to apply the second current to the pixel output so as to accelerate the decline of the voltage at the output of the at least one pixel.

3. The system of claim 1, wherein the current adjustment circuit is configured to adjust the second current applied to the output of the least one pixel based on a rate of the change of the voltage at the output.

4. The system of claim 1, wherein the voltage detection circuit further comprises a first current mirror circuit coupled to the capacitor and configured to generate a third current based on the first current generated by the capacitor.

5. The system of claim 4, wherein the first current mirror circuit is a current amplifier circuit such that the third current is larger than the first current.

6. The system of claim 4, wherein the current adjustment circuit comprises a second current mirror circuit coupled to the voltage change detection circuit and configured to generate the second current to the output of the at least one pixel based on the third current generated by the voltage detection circuit.

7. The system of claim 6, wherein the second current mirror circuit is a current amplifier circuit such that the second current is larger than the third current.

8. The system of claim 1, wherein the image sensor is a complementary metal oxide semiconductor (CMOS) image sensor.

9. The system of claim 1,
wherein the plurality of pixels of the image sensor is an arrange of pixels organized into multiple columns or rows, such that multiple ones of the pixels within a same column or a same row are coupled to a same output, and
wherein the system comprises multiple pixel output settling assist circuits, such that respective ones of the multiple pixel output settling assist circuits are coupled to respective outputs of the multiple columns or rows.

10. A device, comprising:
one or more lenses;
an image sensor comprising a plurality of pixels configured to receive light that passes through the one or more lenses to generate signals;
at least one pixel output settling assist circuit comprising:
a voltage change detection circuit comprising a capacitor coupled to an output of at least one of the pixels of the image sensor that is configured to generate a first current representing a change of a voltage at the output of the at least one pixel of the image sensor during read-out of the signals of the at least one pixel; and
a current adjustment circuit configured to adjust a second current applied to the output of the at least one pixel based on changes of the voltage at the output as the voltage settles to a stable voltage during a settlement period;
read-out circuitry configured to:
sample (a) a first output voltage of the at least one pixel at a reset voltage and (b) a second output voltage of the least one pixel after transfer of charge from the at least one pixel, wherein the first and second output voltages are sampled at a same level of the second current as controlled by the current adjustment circuit; and
determine an accumulated charge of the at least one pixel based on a difference between the first and second output voltages;
a processor configured to process the signals from the pixels indicating accumulated charges of the pixels of the image sensor to generate an image; and
a display configured to display the image generated by the processor.

11. The device of claim 10, wherein the change of the voltage at the output includes a decline of the voltage at the output of the at least one pixel, and wherein the current adjustment circuit is configured to apply the second current to the pixel output so as to accelerate the decline of the voltage at the output of the at least one pixel.

12. The device of claim 10, wherein the current adjustment circuit is configured to adjust the second current applied to the output of the least one pixel based on a rate of the change of the voltage at the output.

13. The device of claim 10, wherein the voltage detection circuit further comprises a first current mirror circuit coupled to the capacitor and configured to generate a third current based on the first current generated by the capacitor.

14. The device of claim 13, wherein the first current mirror circuit is a current amplifier circuit such that the third current is larger than the first current.

15. The device of claim 13, wherein the current adjustment circuit comprises a second current mirror circuit coupled to the voltage change detection circuit and configured to generate the second current to the output of the at least one pixel based on the third current generated by the voltage detection circuit.

16. The device of claim 15, wherein the second current mirror circuit is a current amplifier circuit such that the second current is larger than the third current.

17. The device of claim 10, wherein the image sensor is a complementary metal oxide semiconductor (CMOS) image sensor.

18. The device of claim 10,
wherein the plurality of pixels of the image sensor is an arrange of pixels organized into multiple columns or rows, such that multiple ones of the pixels within a same column or a same row are coupled to a same output, and
wherein the system comprises multiple pixel output settling assist circuits, such that respective ones of the multiple pixel output settling assist circuits are coupled to respective outputs of the multiple columns or rows.

19. A method, comprising:
capturing, using one or more lenses of a camera, light from an environment of the camera;
generating, using a plurality of pixels of an image sensor of the camera, image signals based on the light captured by the one or more lenses of the camera;
generating, using a capacitor of a voltage change detection circuit of at least one pixel output settling assist circuit of the camera, a first current representing a change of a voltage at an output of at least one of the pixels of the image sensor during read-out of the image signals of the at least one pixel;
adjusting, using a current adjustment circuit of the pixel output settling assist circuit, a second current applied to the output of the at least one pixel based on changes of the voltage at the output as the voltage settles to a stable voltage during a settlement period;
sampling (a) a first output voltage of the at least one pixel at a reset voltage and (b) a second output voltage of the least one pixel after transfer of charge from the at least one pixel, wherein the first and second output voltages are sampled at a same level of the second current as controlled by the current adjustment circuit;
determining an accumulated charge of the at least one pixel based on a difference between the first and second output voltages; and
processing the image signals from the pixels indicating accumulated charges of the pixels to generate an image.

20. The method of claim 19, wherein the change of the voltage includes a decline of the voltage at the output of the at least one pixel, and wherein the second current is applied to the pixel output so as to accelerate the decline of the voltage at the output of the at least one pixel.

* * * * *